(12) United States Patent
Toet

(10) Patent No.: US 9,211,663 B2
(45) Date of Patent: Dec. 15, 2015

(54) DEVICE FOR COMPACTING A GRANULAR MASS SUCH AS CONCRETE CEMENT

(75) Inventor: Gijsbert Toet, Eksel (BE)

(73) Assignee: DEN BOER STAAL B.V., Groot Ammers (NL)

( * ) Notice: Subject to any disclaimer, the term of this patent is extended or adjusted under 35 U.S.C. 154(b) by 391 days.

(21) Appl. No.: 13/812,903

(22) PCT Filed: Jul. 28, 2011

(86) PCT No.: PCT/NL2011/050545
§ 371 (c)(1),
(2), (4) Date: Feb. 12, 2013

(87) PCT Pub. No.: WO2012/015305
PCT Pub. Date: Feb. 2, 2012

(65) Prior Publication Data
US 2013/0145755 A1    Jun. 13, 2013

(30) Foreign Application Priority Data
Jul. 29, 2010    (NL) .................................... 2005171

(51) Int. Cl.
*B29C 43/58* (2006.01)
*B06B 1/18* (2006.01)
*B28B 1/087* (2006.01)
*B28B 3/02* (2006.01)
*B30B 11/02* (2006.01)
(Continued)

(52) U.S. Cl.
CPC . *B29C 43/58* (2013.01); *B06B 1/18* (2013.01); *B28B 1/0873* (2013.01); *B28B 3/022* (2013.01); *B30B 11/022* (2013.01); *F04B 23/00* (2013.01); *F15B 15/1452* (2013.01); *F15B 21/12* (2013.01)

(58) Field of Classification Search
CPC ....... F15B 21/12; B28B 3/022; B28B 1/0873; B30B 11/022
USPC ................................................ 91/515; 60/546
See application file for complete search history.

(56) References Cited

U.S. PATENT DOCUMENTS 6,054,079 A * 4/2000 Toet et al. ..................... 425/421
6,342,750 B1 * 1/2002 Braungardt et al. ..... 310/323.18
(Continued)

FOREIGN PATENT DOCUMENTS

DE    10 2006 018810 A1    10/2007
DE    102006018810 A1 *    10/2007
(Continued)

OTHER PUBLICATIONS

International Search Report, dated Jan. 16, 2012, from corresponding PCT application.

*Primary Examiner* — Thomas E Lazo
(74) *Attorney, Agent, or Firm* — Young & Thompson

(57) ABSTRACT

An improved compacting device for compacting a granular, loosely coherent mass, such as soil-moist cement, for producing end products such as tiles, kerbstones and the like. The compacting device includes a vibrating table and a hydraulic exciter device for driving the vibrating table. The hydraulic exciter device includes a plurality of hydraulic exciters and is configured to drive the hydraulic exciters with excitation displacements of mutually substantially the same amplitude and frequency and in phase with one another. An improved hydraulic exciter for use in the improved compacting device, and the improved compacting device with a single improved exciter of this type are also described.

25 Claims, 8 Drawing Sheets

(51) Int. Cl.
*F15B 15/14* (2006.01)
*F15B 21/12* (2006.01)
*F04B 23/00* (2006.01)

(56) References Cited

U.S. PATENT DOCUMENTS

| | | | |
|---|---|---|---|
| 7,025,583 B2 * | 4/2006 | Bald | 425/255 |
| 7,269,949 B1 * | 9/2007 | Petricio Yaksic | 60/546 |
| 7,465,161 B2 * | 12/2008 | Schulze et al. | 425/211 |
| 2003/0113397 A1 * | 6/2003 | Bald | 425/412 |

FOREIGN PATENT DOCUMENTS

| | | |
|---|---|---|
| EP | 0 870 585 A1 | 10/1998 |
| JP | 11-300714 A | 11/1999 |
| NL | 1005862 C1 | 10/1998 |
| SU | 856 796 A1 | 8/1981 |
| SU | 1038234 A | 8/1983 |
| WO | WO 2007147422 A1 * | 12/2007 |

* cited by examiner

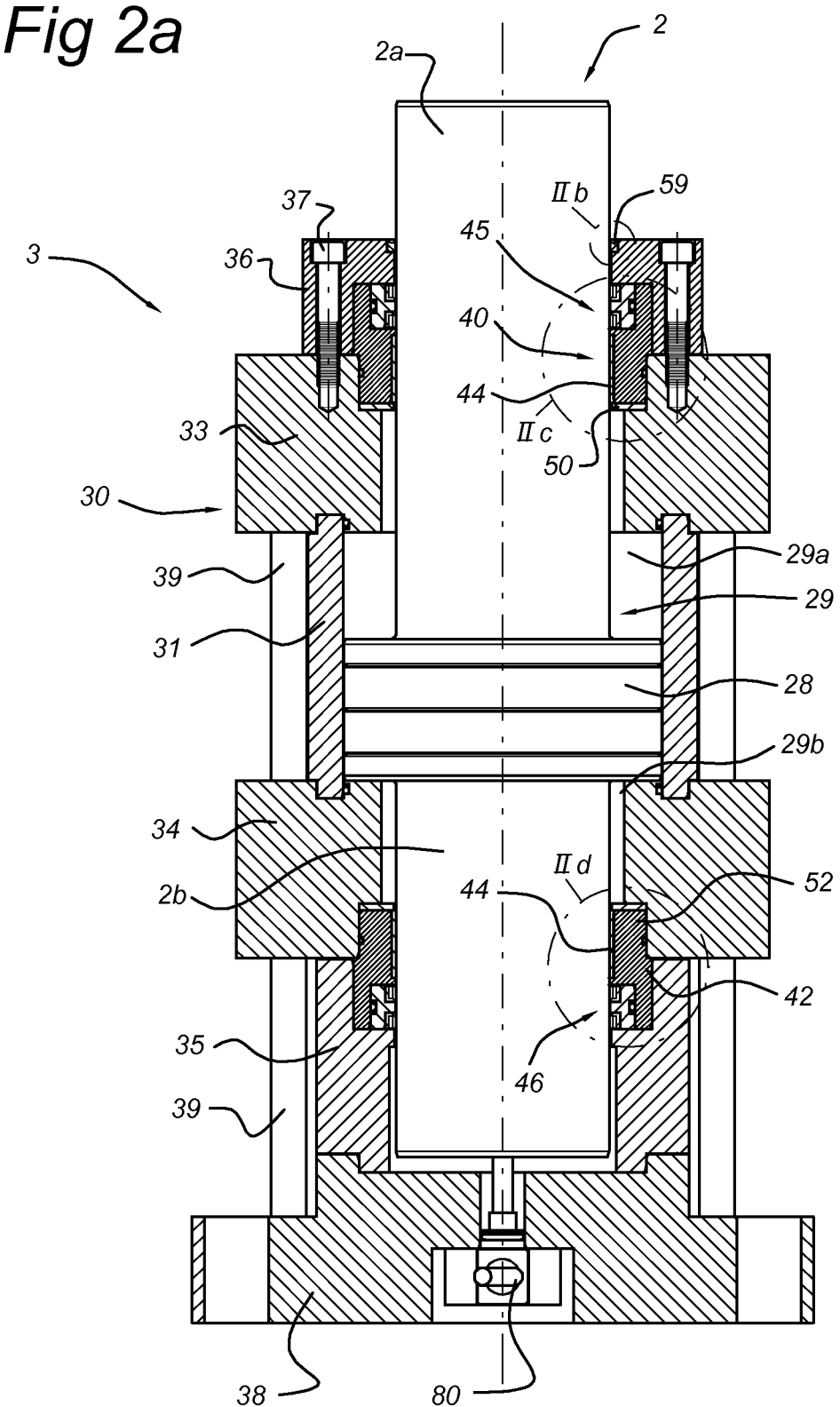

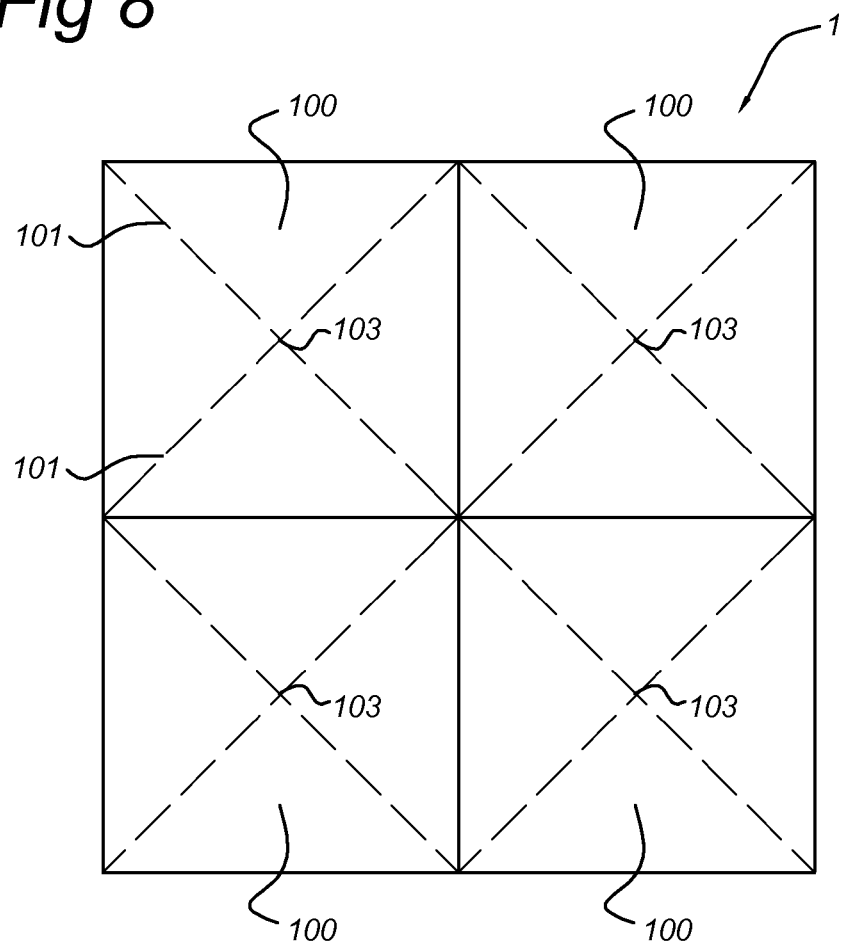

DEVICE FOR COMPACTING A GRANULAR MASS SUCH AS CONCRETE CEMENT

BACKGROUND OF THE INVENTION

1. Field of the Invention

The invention relates to the field of compacting a granular, loosely coherent mass, such as soil-moist concrete cement. By compacting the mass, the air content thereof is reduced, and a strong coherent product is obtained. The products in question may be tiles, kerbstones and various other products made of concrete and the like. In particular, the invention relates to a compacting device with a hydraulic exciter device, and a hydraulic exciter device suitable for such a compacting device.

2. Description of the Related Art

NL-1005862 and EP 0 870 585 B1 disclose a device for compacting a granular, loosely coherent mass, such as soil-moist cement, for producing end products, such as tiles, kerbstones and the like. The known device comprises a vibrating table and a mould for the mass to be compacted, a stamp for pressing onto the mass in the mould, a hydraulic exciter and a hydraulic pressure element connected to the vibrating table or stamp, respectively, drive means and control means for controlling the exciter and the pressure element. The known device is configured so as to carry out a method which comprises the following steps:

selecting a frequency range with a lowest value and a highest value for the excitation frequency, regulating the excitation frequency in such a manner that said frequency range is passed through at least partly and that the natural frequency of the hydraulic-mechanical mass spring system is reached, said hydraulic-mechanical mass spring system being formed by the movable part of the exciter, the vibrating table, the mould and the mass to be compacted, as well as the compressible hydraulic medium which is situated between the movable part of the exciter and the respective drive means (in particular comprising an electrohydraulic control element).

The hydraulic exciter of the known device comprises a piston/cylinder device in which the movable part comprises a piston which is moved to and fro in an excitation cylinder by means of the respective drive means and control means. The piston is connected to a piston rod which is connected to the vibrating table at an excitation position on the vibrating table, which makes it possible to produce an excitation displacement at the excitation position. The excitation displacement is the sum of a working position and an excitation oscillation with the excitation frequency and an excitation amplitude around this working position.

It is a drawback of the known device that the vibrating table has to have a high degree of stiffness in order to achieve a substantially uniform vibration across the entire surface of the vibrating table when this is driven in the centre by the exciter. In order to produce larger products and/or more products per run, the dimensions of the vibrating table have to be increased. If the dimensions of the vibrating table are increased, the resulting table will be very heavy due to the stiffness requirements. This entire heavy table will have to be driven and pass through the frequency range which is associated with the great forces which are required therefor. It is therefore desired to provide a device which can be operated in a more efficient manner, for example due to the fact that it may comprise a relatively light table.

In a known device, the excitation cylinder is, for example, a piston/cylinder device fitted with hydrostatic bearings. Such a known piston/cylinder device is associated with, for example, an energy loss of approximately 20% due to leakage flow across the hydrostatic bearings. It is therefore desired to provide a more efficient excitation cylinder. Preferably, the more efficient excitation cylinder can in addition be used in the more efficient device, so that an optimum efficient device is obtained.

SU-A-856796 discloses a compacting device, comprising: a vibrating table, a mould which is intended for the mass to be compacted and which is attached to the vibrating table, at least during use of the compacting device, a hydraulic exciter device connected to the vibrating table, wherein the hydraulic exciter device comprises a plurality of hydraulic exciters, each hydraulic exciter is connected to the vibrating table, the hydraulic exciters are mutually parallel, and the hydraulic exciter device is configured to drive the hydraulic exciters with excitation displacements of mutually substantially the same amplitude and the same frequency and in phase with one another.

SUMMARY OF THE INVENTION

It is an object of the invention to provide an improved method and device for the compacting of, for example, soil-moist concrete cement. In particular, it is an object to provide an improvement which makes it possible to compact a mass across a larger surface, so that, for example, products of larger dimensions can be compacted or, for example, a larger amount of products can be compacted per run than with the known device. In addition, or instead thereof, it may be an object to provide an improvement which results in a higher efficiency in use.

According to a first aspect, the invention provides a compacting device wherein a drive means is provided which is configured so as to evenly distribute a hydraulic volumetric flow of a compressible hydraulic medium between all the hydraulic exciters. By means thereof, the hydraulic exciters can be driven synchronously by means of a hydraulic volumetric flow, with only a single hydraulic volumetric flow having to be provided and regulated. This avoids the complexity which would result from providing several individual hydraulic volume flows, one for each exciter, and which each have to be provided separately and in such a manner that all exciters are operated at the same excitation displacements.

In a further embodiment, the drive means comprises an electro-hydraulic servo valve, a manifold and a plurality of distribution pipes, wherein the servo valve is configured to provide a hydraulic volumetric flow to the manifold and wherein the manifold is configured to evenly distribute the hydraulic volumetric flow from the servo valve between the distribution pipes, which distribution pipes are connected to respective hydraulic exciters. By means thereof, the hydraulic exciters can be driven synchronously by a single valve, thus avoiding the additional costs of several valves. In a further embodiment, the hydraulic pipe paths, measured from the servo valve to each of the respective hydraulic exciters, are identical in length and in volume. As a result thereof, the hydraulic exciters can be driven in a relatively simple manner at the same frequency, amplitude and in phase with one another.

The vibrating table is thus driven by several hydraulic exciters in several locations, with the same excitation displacement at each of the several locations. This makes it possible to achieve a substantially uniform vibration across the entire surface of the vibrating table, requiring a less high degree of stiffness of the vibrating table than when the compacting device only has a single exciter which excites the vibrating table in its centre as is the case with the known device. As a result thereof, a lighter vibrating table can be used than with a single exciter. This is particularly advantageous if the dimensions of the vibrating table are relatively large, thus making it possible to compact relatively large products or more products per run. Moreover, a lighter vibrating table can result in a lower installed power. The hydraulic exciter device can be configured to drive the exciters with excitation displacements with mutually substantially the same amplitude and frequency and in phase with one another by means of a drive means together with a control means. The term excitation displacement is used in order to denote the sum of a working position of the hydraulic exciter and an excitation oscillation at a frequency and an amplitude around this working position. This frequency can also be denoted as the excitation frequency and this amplitude as the excitation amplitude.

According to an embodiment, a control means is provided wherein the control means is configured to control the drive of each of the hydraulic exciters of the plurality of hydraulic exciters on the basis of a determination of the excitation displacement of one and only one single hydraulic exciter of the plurality of hydraulic exciters. Thus, the excitation displacement, and therefore the working position and the amplitude, of only this one hydraulic exciter is actively controlled. The excitation displacement of the other hydraulic exciters is not actively controlled: the other hydraulic exciters are driven on the basis of the excitation displacement of only the one hydraulic exciter. Thus, it is possible to provide a relatively simple control means. For example, any possible complexity of a control means can be avoided which would be required if each hydraulic exciter were to be actuated separately and controlled separately on the basis of respective determinations of the respective excitation displacements, in which case the control means would have to be provided with a complex control arrangement in order to achieve a substantially mutual synchronicity in amplitude and frequency and without phase difference between all hydraulic exciters.

In order to determine the excitation displacement, the single hydraulic exciter is, according to a further embodiment, provided with a sensor, such as a displacement sensor, which is configured to determine the excitation displacement of the one and only one single hydraulic exciter and to pass on the determined excitation displacement to the control means. As a result thereof, the other exciters do not have to be equipped with sensors, thus saving costs which would otherwise have been necessary if several sensors had been required.

In particular, the control means are configured to actuate the drive means, and in particular the single electro-hydraulic servo valve, on the basis of the determination of the excitation displacement of a single hydraulic exciter. This makes it possible to save costs which would otherwise have been necessary if several electro-hydraulic servo valves and/or several sensors had been required.

According to an embodiment, the hydraulic exciter device is configured to carry out a method which comprises the following steps:
  selecting a frequency range with a lowest value and a highest value for an excitation frequency, and
  controlling the excitation frequency in such a manner that said frequency range is passed through at least partly and that a natural frequency of the hydraulic-mechanical mass spring system is reached and passed, said hydraulic-mechanical mass spring system being formed by the movable part of the exciter, the vibrating table, the mould and the mass to be compacted, as well as the compressible hydraulic medium which is situated between the hydraulic exciters and the drive means. Passing through the frequency range results in frequencies, amplitudes and associated accelerations by means of which the mass to be compacted can be compacted quickly and effectively, in particular due to the fact that the device is briefly operated at the natural frequency when said frequency range is being passed through.

Further embodiments are defined in the dependent claims.

According to a second aspect, the invention provides a hydraulic exciter comprising a piston/cylinder device comprising at least one piston rod and a housing, which housing is provided with at least one bearing for guiding the at least one piston rod in the housing and which bearing is provided with a metal/polymer layer. The metal/polymer layer has a very low coefficient of friction. As a result thereof, the piston rod can be moved into the housing with very few losses and the relatively high leakage flow losses of hydrostatic bearings are avoided.

In this case, it should be noted that it was a widely held view amongst those skilled in the art that the high usage requirements for a compacting device make it necessary to use a hydrostatic bearing in which a liquid layer between the piston rod and the housing prevents direct contact between the piston rod and the housing. The liquid layer is in this case produced by a constant supply of a highly pressurized liquid to a slot, for example, a wedge-shaped or cylindrical slot, between the piston rod and the housing.

As a result thereof, there is always a leakage flow of liquid with such a hydrostatic bearing, which results in a loss of energy and in addition requires a liquid circuit for the supply and discharge of the leakage flow of liquid. The use of a bearing with direct contact, such as in the exciter according to the invention, between the metal/polymer layer and the piston rod, was not deemed possible by those skilled in the art due to, for example, the frictional losses associated with conventional bearing materials.

Surprisingly, however, these problems do not appear to occur with a bearing provided with a metal/polymer layer for low-friction guiding of the piston rod in the housing. In addition, no liquid circuit is required for a metal/polymer bearing for the supply and discharge of leaking hydraulic liquid, and neither is a filter device in the liquid circuit required contrary to what is often the case with hydrostatic bearings, resulting in a simple hydraulic exciter. However, a liquid, for example the hydraulic liquid, can be situated between the metal/polymer bearing and the piston rod in order to further reduce the friction and/or for lubrication.

The hydraulic exciter according to the invention is in particular suitable for a compacting device, as this exciter can perform relatively quick movements at a relatively small amplitude, such as for example 30-100 Hz, with an amplitude of a few millimeters at 30 Hz to approximately 1.5 mm at 100 Hz, and at accelerations of more than 200 m/s$^2$, while generating relatively little heat. Such frequencies, amplitudes and accelerations are particularly suitable for quickly and effectively compacting, for example, earth-like cement.

According to an embodiment, each hydraulic exciter comprises two piston rods which extend from either side of the piston and the housing comprises two respective bearings. The two bearings thus guide the piston rod in the housing during use, thus producing a piston/cylinder device which can satisfy the high usage requirements for a compacting device.

According to an embodiment, the piston rod is rigidly connected to the piston of the piston/cylinder device.

According to an embodiment, the piston is movable in a piston chamber and a first hydraulic pipe and a second hydraulic pipe on either side of the piston are connected to the piston chamber. In particular, the drive means and the control means may be configured to provide a hydraulic volumetric flow of a determined frequency and phase in the first hydraulic pipe and to provide a hydraulic volumetric flow of the same determined frequency and opposite phase in the second hydraulic pipe. This results in the piston being driven symmetrically and provides a powerful piston/cylinder device which is particularly suitable for a compacting device according to the invention. Further embodiments are defined by the features of the dependent claims.

According to a third aspect, the invention provides a compacting device provided with such a hydraulic exciter with metal/polymer bearings. This makes it possible to achieve an efficient compaction with relatively little loss of energy, both for a compacting device with a vibrating table of the known size and for a compacting device with a vibrating table of a larger size.

Further embodiments are defined by the features of the dependent claims.

According to a fourth aspect, the invention provides a compacting device provided with several such hydraulic exciters with metal/polymer bearings. As, despite the lower friction, there may still be differences in internal friction between several hydraulic exciters (which differences are relatively possibly even greater than with the known, fully developed piston/cylinder devices with hydrostatic bearings), the average person skilled in the art might expect problems when using several hydraulic exciters. Therefore, the person skilled in the art will equip the compacting device with a single hydraulic exciter, despite the abovementioned drawbacks. In an experiment in which several hydraulic exciters which were arranged next to one another without a vibrating table having been placed on top thereof, were being compared to one another, the inventor has indeed noticed that the differences in friction can be so great that hydraulic exciters behave differently in a practically static state when they are driven in the same way, that is to say at the same hydraulic volumetric flow to each of the several hydraulic exciters. However, the inventor has concluded that these differences effectively smooth out when the several hydraulic exciters are connected to the vibrating table or rigidly to one another in another way. Thus, an efficient compacting device is obtained by means of which larger products and/or a larger number of products per run can be compacted using little energy.

Further embodiments of a compacting device provided with several hydraulic exciters are described in the dependent claims.

According to a further aspect, the invention provides a method for operating a compacting device according to the invention, comprising driving all hydraulic exciters of the plurality of hydraulic exciters with excitation displacements of the same amplitude and the same frequency and in phase with one another. Thus, a uniform excitation vibration is obtained across the entire table surface with, for example, a relatively light table and/or relatively low energy losses.

According to an embodiment, the method furthermore comprises the following steps:
providing a source of hydraulic fluid,
providing a hydraulic volumetric flow of a determined amplitude and frequency to the hydraulic fluid,
determining the excitation displacement of a single hydraulic exciter of the plurality of hydraulic exciters, and
driving each of the hydraulic exciters of the plurality of hydraulic exciters on the basis of the excitation displacement of only the one hydraulic exciter, and evenly distributing, from a distribution point, the hydraulic volumetric flow between a plurality of hydraulic paths of identical length and identical volume measured from the distribution point up to the respective hydraulic exciters.

Further embodiments of the method are described in the dependent claims.

BRIEF DESCRIPTION OF THE DRAWING FIGURES

The invention will be described in more detail with reference to the figures, in which:

FIG. 1 diagrammatically shows a view of a compacting device with a single hydraulic exciter;

FIG. 2a diagrammatically shows a view of a hydraulic exciter according to an embodiment of the invention; FIGS. 2b-2d show details of FIG. 2a;

FIG. 3 diagrammatically shows a compacting device with a hydraulic exciter device with a plurality of hydraulic exciters according to an embodiment of the invention;

FIG. 4 diagrammatically shows a view of the hydraulic exciter device from FIG. 3;

FIG. 5 shows a hydraulic diagram of the hydraulic exciter device from FIG. 3 and FIG. 4;

FIG. 6 diagrammatically shows a top view of the hydraulic exciter device from FIG. 3 and FIG. 4;

FIG. 8 shows an example of a square vibrating table for the hydraulic exciter device from FIG. 3.

DETAILED DESCRIPTION OF THE INVENTION

Figure 1:
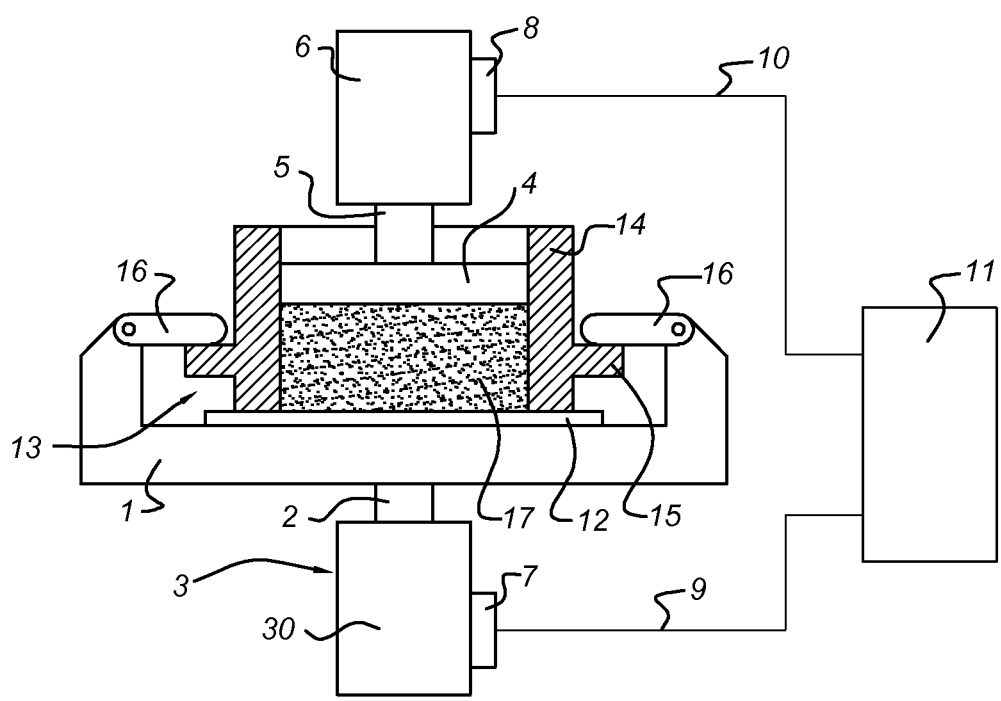

The device illustrated in FIG. 1 comprises a vibrating table 1 which is connected to the piston rod 2 of the hydraulic exciter 3. Furthermore, the device comprises a stamp 4 which is connected to the piston rod 5 of the hydraulic pressing piston/cylinder device 5, 6. Both the hydraulic exciter 3 and the hydraulic pressing piston/cylinder device 5, 6 can be operated by respective servo mechanisms 7, 8 which are connected to an electronic control device 11 via electrical control lines 9, 10. The hydraulic exciter 3 can generate a vibration in the vibrating table, as is described below. The hydraulic pressing piston/cylinder device 5, 6 can exert a pressure on a granular material 17, such as for example mortar, in use, as is described below. Servo mechanisms 7, 8 may also be referred to by the term drive means. The electronic control device 11 can also be referred to by the term control means.

A transport plate 12 is arranged on the vibrating table 1 on which the mould which is denoted overall by reference numeral 13 is placed. This mould is open at the top and bottom and essentially consists of a continuous wall 14 having the desired cross-sectional shape of the compacted product to be obtained or the desired cross-sectional shapes of several compacted products to be obtained simultaneously, as well as a flange 15. On this flange 15, the clamping jaws 16 of a clamping mechanism can be clamped with an adjustable, if desired programmable clamping force. The number of clamping jaws 16 which is fitted along the circumference of the flange 15 is such that the mould 13, plate 12 and vibrating table 1 operate as a single entity from a mechanical point of view, even with the vibrations generated in the vibrating device.

The material to be treated, such as concrete cement (mortar) or another granular material 17, is placed in the mould which is subsequently made to vibrate by the hydraulic exciter 3, vibrating table 1, plate 12 and mould 13.

The shape of the stamp 4 is adapted to the internal shape of the mould 13 and exerts a specific pressure on the mortar 17 when vibrating.

The control unit 11 can set the magnitude of the pressure to a value which is optimal for compacting a specific type of granular material, for example a specific type of mortar, and/or for the properties of the compacted product to be obtained. Said pressure may be varied continuously during compacting as a function of time in order for the compacting process to proceed in an optimum manner.

Furthermore, the pressure/time function of the hydraulic pressing piston/cylinder device 5, 6 can be coupled to the frequency/time function by means of which the exciter 3 is operated.

The resulting compaction of the granular material depends on the magnitude of the acceleration to which it has been subjected. It is best to generate a sufficiently high frequency within the frequency range at adequate amplitude, as the resulting acceleration is substantially linearly proportional to the amplitude, but quadratic to the frequency.

Due to the hydraulic-mechanical mass spring system, as illustrated in FIG. 1, it is possible to achieve great savings with respect to the time required for compacting the mortar 17 in such a manner that an end product of good quality is obtained with respect to the size of the occurring amplitude and with respect to the accelerations. This can be carried out in a manner similar to that described in NL-1005862 and EP 0 870 585 B1, where a compacting device with a hydraulic exciter device comprising a single hydraulic exciter is described. Reference is furthermore made to NL-1005862 and EP 0 870 585 B1 for the manner in which the vibrations can be generated, in particular by passing through a frequency range in which a peak in the amplitude obtained occurs at a certain frequency f0. At this frequency f0 the acceleration will therefore be as large as possible. The vibrating device according to the invention only has to be operated at this frequency f0 for a short time, as the generated accelerations are so large, that the granular material is compacted in a short time. In addition, the frequency range is passed through further, beyond frequency f0, thus avoiding the risk of damage to the device caused by natural resonance at this frequency f0.

The hydraulic exciter 3 is connected to the vibrating table 1. The vibrating table 1 has dimensions which are such that it can support a relatively large mould 13. The vibrating table 1 has a size, for example, of 2.15 meters×2.15 meters in order to support a mould 13 of approximately 2.00 meters×2.00 meters. Using a mould 13 of that size, it is possible, for example, to obtain a single concrete slab of approx. 2.00 meters×2.00 meters by compacting the mortar 17 in a mould with an internal shape which provides a single square space of such dimensions. Likewise, it is also possible to obtain four tiles of 100 centimeters×100 centimeters using a mould 13 of such dimensions, for example, with a single passage by compacting the mortar 17 in a mould with an internal shape which provides four square spaces in a single run, following which the shaped and compacted mortar 17 is discharged to a drying device using the transport plate 12. A reinforcement can be provided in the mould 13 before or during the filling with mortar 17 if the strength of the tiles to be produced requires it. It is also possible to apply a second layer of mortar of a different type on top of the mortar 17 and to subsequently compact this, so that a top layer of the second layer of mortar, for example of a different type, is obtained.

As such a size requires a relatively large mass of mortar 17, mould 13, plate 12 and vibrating table 1, it is desirable to use a hydraulic exciter with relatively low loss of energy. The compacting device 1 according to the embodiment shown in FIG. 1 is to this end provided with a hydraulic exciter with reduced loss of energy, for example as illustrated in FIG. 2a.

Figure 2B:
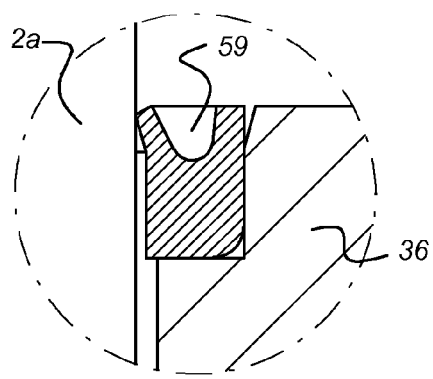
Figure 2C:
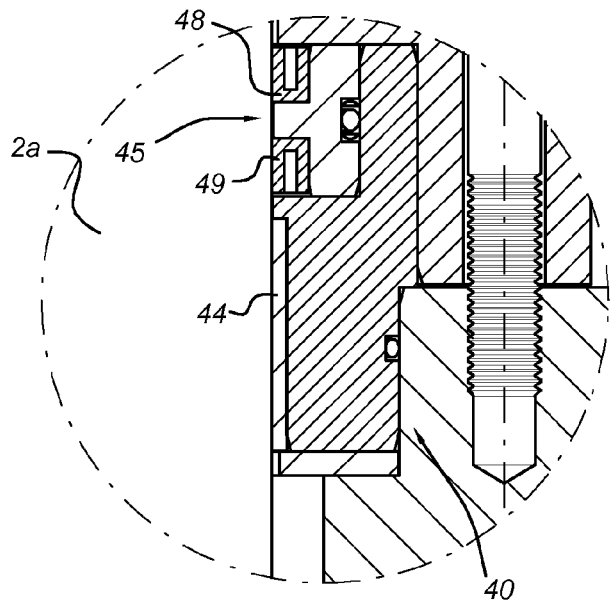
Figure 2D:
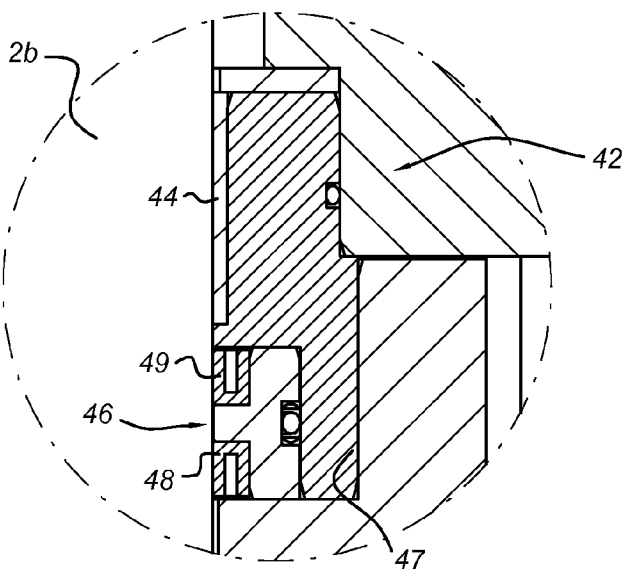

FIG. 2a shows a diagrammatic view of a hydraulic exciter 3 according to an embodiment of the invention. FIGS. 2b-2d show details of the areas indicated in FIG. 2a by IIb, IIc and IId.

The hydraulic exciter 3 has a piston 28 which is axially movable in a cylinder 31 of a housing 30 along a cylinder axis. The hydraulic exciter 3 furthermore has a highest piston rod 2a and a lowest piston rod 2b, which are axially movable in the housing 1 along the cylinder axis. The highest piston rod 2a can also be denoted as "the first piston rod" or "the first piston rod part". The lowest piston rod 2b can also be denoted as "the second piston rod" or "the second piston rod part". The highest piston rod 2a and the lowest piston rod 2b together can be denoted as "the piston rod 2". The housing is denoted overall by reference numeral 30 and, in the illustrated example, is composed of several parts which together form the housing. The housing 30 comprises a cylinder 31 between a first block 33 and a second block 34. In the cylinder 31, a hydraulic pressure can be created in a cylinder space 29. The second block 34 is connected to a third block 38 by means of a bottom tube 35. At the bottom side, the housing 30 is closed off by the third block 38. The third block 38 also serves for connection to a foundation (90, 91; not shown in FIG. 2a). At the top side, the housing 30 is provided with a ring 36 which is provided with an end seal 59 between the highest piston rod 2 and the housing 30 and which is connected to the first block 33 by means of bolts 37. An assembly formed by the first block 33, the cylinder 31, the second block 34, the bottom tube 35 and the third block 38 is held together by draw bars 39 which extend through the entire assembly. The piston 28 is accommodated in the cylinder space 29. At the top side, the piston 28 is connected to the highest piston rod 2a and at the bottom side to the lowest piston rod 2b. The part of the cylinder space 29 above the piston 28 is denoted in FIG. 2a as upper space 29a. The part of the cylinder space 29 below the piston 28 is denoted in FIG. 2a as lower space 29b. A first hydraulic pipe (not shown) ends in the upper space 29a and contains hydraulic fluid which is operated by a servo valve (not shown in FIG. 2a) with a first volumetric flow of a magnitude which is varied according to a frequency range. In the example, the hydraulic fluid is a hydraulic oil, but may also be another liquid or a gas in alternative embodiments. A second hydraulic pipe (not shown) ends in the lower space 29b and contains the same hydraulic fluid which is operated in a complementary manner by the same or another servo valve (not shown in FIG. 2a) as the hydraulic fluid in the first hydraulic pipe. The volumetric flows to the upper space 29a and the lower space 29b are thus varied at the same frequency, but in opposite phase. Thus, the piston 28 is moved up and down by means of the resulting pressure difference between the upper space 29a and the lower space 29b. The hydraulic exciter 3 has two bearings 40, 42 for guiding the piston rods 2a and 2b in the housing 30. Bearing 40 guides the highest piston rod 2a. Bearing 42 guides the lowest piston rod 2b. The bearings 40, 42 are provided with a metal/polymer layer 44. The metal/polymer layer 44 has a bearing coefficient of friction, resulting in a very efficient guiding of the piston rod 2 in the housing 30 with low loss of energy and little generation of heat. The bearings 40, 42 are accommodated in continuous recesses 50, 52 in the housing 30. In the illustrated example, these are accommodated in a first continuous recess 50 formed in the ring 36 and the first block 33 of the housing 30 and in a second continuous recess 52 formed in the second block 34 and the bottom tube 35 of the housing 30, respectively.

The metal/polymer layer 44 shown in FIGS. 2a, 2c and 2d is formed by a layer of a polytetrafluoroethene (PTFE), a further fluoropolymer and a filler. In this specific example, this layer is formed substantially from DP31™, the trade name of a specific metal/polymer which is marketed by GGB. DP3™ has a particularly suitable, low frictional resistance and is very strong, which makes this material eminently suitable for a heavy application such as this. In addition, the composition of the metal/polymer DP31™ has the characteristic that it makes this composition resistant to cavitation, that is to say that hydraulic liquid substantially does not penetrate this composition. As a result thereof, the risk of small pieces of material breaking off is significantly reduced and the hydraulic liquid remains free from contamination by pieces of bearing material. Alternatively, other metal/polymer materials can be used.

Furthermore, the housing 30 has a first and a second seal 45, 46 between the piston rod 2 and the housing 30, which seals are accommodated in further continuous recesses 47 in the housing 30. The bearings 40, 42 are situated between the first and the second seals 45, 46 in the axial direction. The first and second seals 45, 46 thus seal the cylinder space 29 between the cylinder 31 and the piston rod 2 virtually hermetically from the outside world, thus reducing pressure loss. The seals 45, 46 each have two lips 48, 49, as is illustrated. Each outer lip 48 is formed by a U-shaped PTFE bush comprising a stainless steel spring with a spring opening turned away from the cylinder space 29. Each inner lip 49 is formed by a U-shaped PTFE bush comprising a stainless steel spring with a spring opening turned towards the cylinder space 29.

The hydraulic exciter 3 may be provided with a sensor 80 (FIG. 2a) for emitting a signal which is representative of the excitation displacement of the hydraulic exciter 3. The sensor may, for example, be a displacement sensor and may be configured to determine the displacement of the piston rod 2 in the housing 30 in the direction of the longitudinal axis of the piston rod. In particular, the sensor 80 may be configured to determine the displacement of the lowest piston rod 2b. Based on this signal, a control means can regulate a working position and/or amplitude of a regular movement of the piston rod 2.

Figure 3:
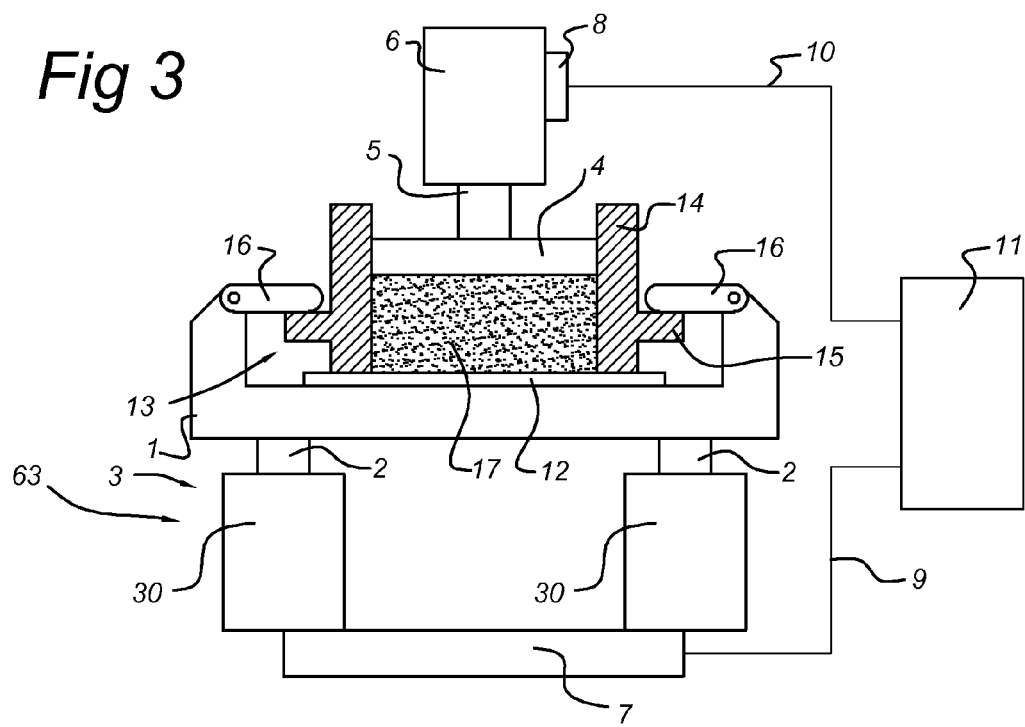

FIG. 3 diagrammatically shows a view of a compacting device comprising a hydraulic exciter device with a plurality of hydraulic exciters according to an embodiment of the invention.

The compacting device of FIG. 3 differs from that of FIG. 1 by the fact that the single hydraulic exciter 3 with piston rod 2 has been replaced by a hydraulic exciter device 63. The hydraulic exciter device 63 has a plurality of hydraulic exciters 3, each connected to the vibrating table 1 by a respective piston rod 2. The hydraulic exciters 3 are mutually parallel, which means that the piston rods 2 of the hydraulic exciters 3 are parallel with respect to one another. In particular, all piston rods 2 are at right angles to the top surface of the vibrating table 1, on which the mould 13 with the mortar 17 is situated during use. The hydraulic exciter device 63 can be controlled by servo mechanisms 7 which are connected to an electronic control device 11 via electrical control lines 9. The electronic control device 11 can also be designated as control means 11. The servo mechanism 7 can also be referred to as drive means 7. The hydraulic exciter device 63 is configured to drive the hydraulic exciters 3 at mutually substantially the same amplitude, frequency and phase by means of the drive means 7 in cooperation with the control means 11.

The hydraulic exciters 3 are rigidly connected to one another via the vibrating table 1. The piston rods 2 of the hydraulic exciters 3 are mutually connected in a flexurally stiff manner in a plane which is defined by the axes of in each case two piston rods.

Each hydraulic exciter 3 is of the type as described with reference to FIGS. 2a-2d and has, in general terms, a piston/cylinder device 28, 30 with two piston rods 2a, 2b (referred to collectively as the piston rod 2), a housing 30 and two bearings 40 for guiding the two piston rods 2a, 2b in the housing 30, wherein the bearings 40 are provided with a metal/polymer layer 44, in particular of DP31™. An example of such a hydraulic exciter device comprising four hydraulic exciters with DP31™ bearings is suitable for use with a vibrating table with transport plate and mould weighing a total of 5000 kg, on which 1500 kg of granular material can be compacted in the mould, across a frequency range of, for example, 40 to 80 Hz, at a resonance in the excitation amplitude around 70 Hz with an amplitude of approximately 1.5 mm and an associated acceleration of approximately 290 m/s$^2$.

Each hydraulic exciter 3 can alternatively comprise a hydrostatic piston/cylinder device of a known type.

Figure 4:
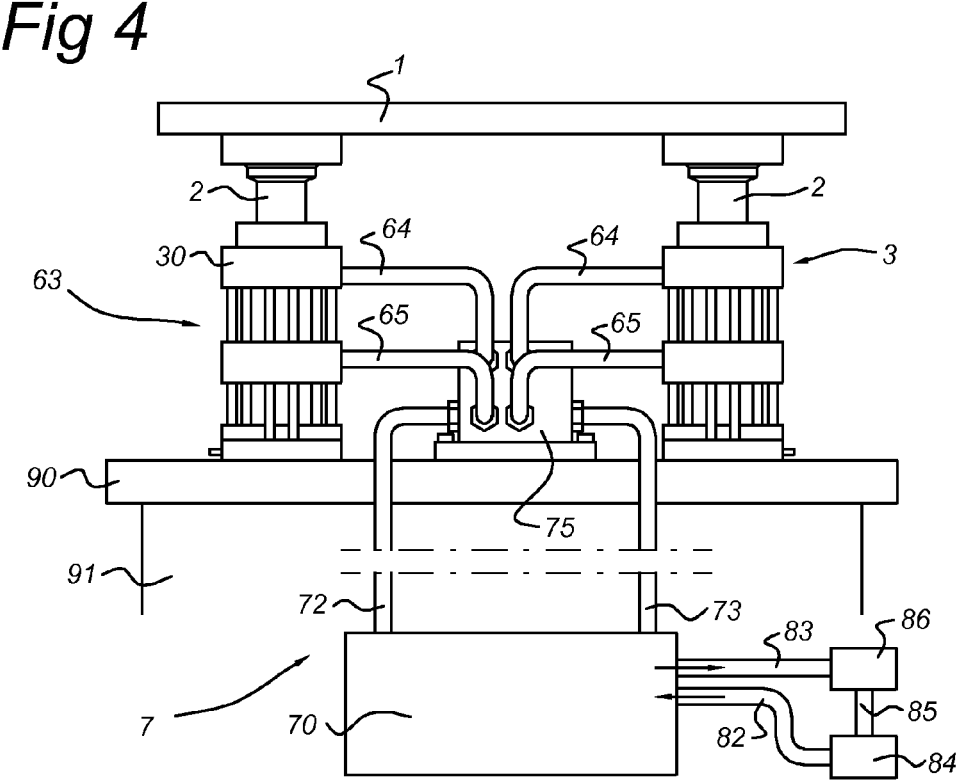
Figure 5:
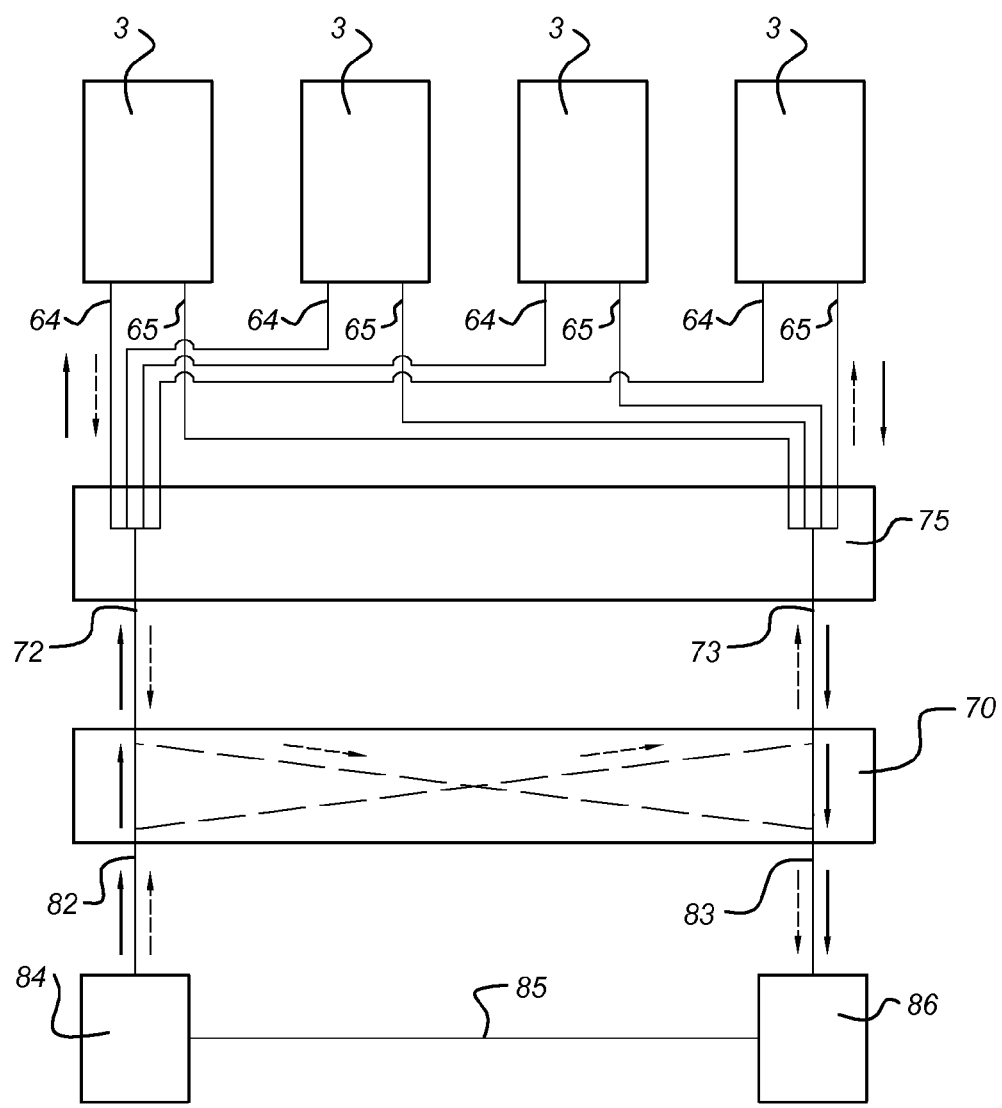
Figure 6:
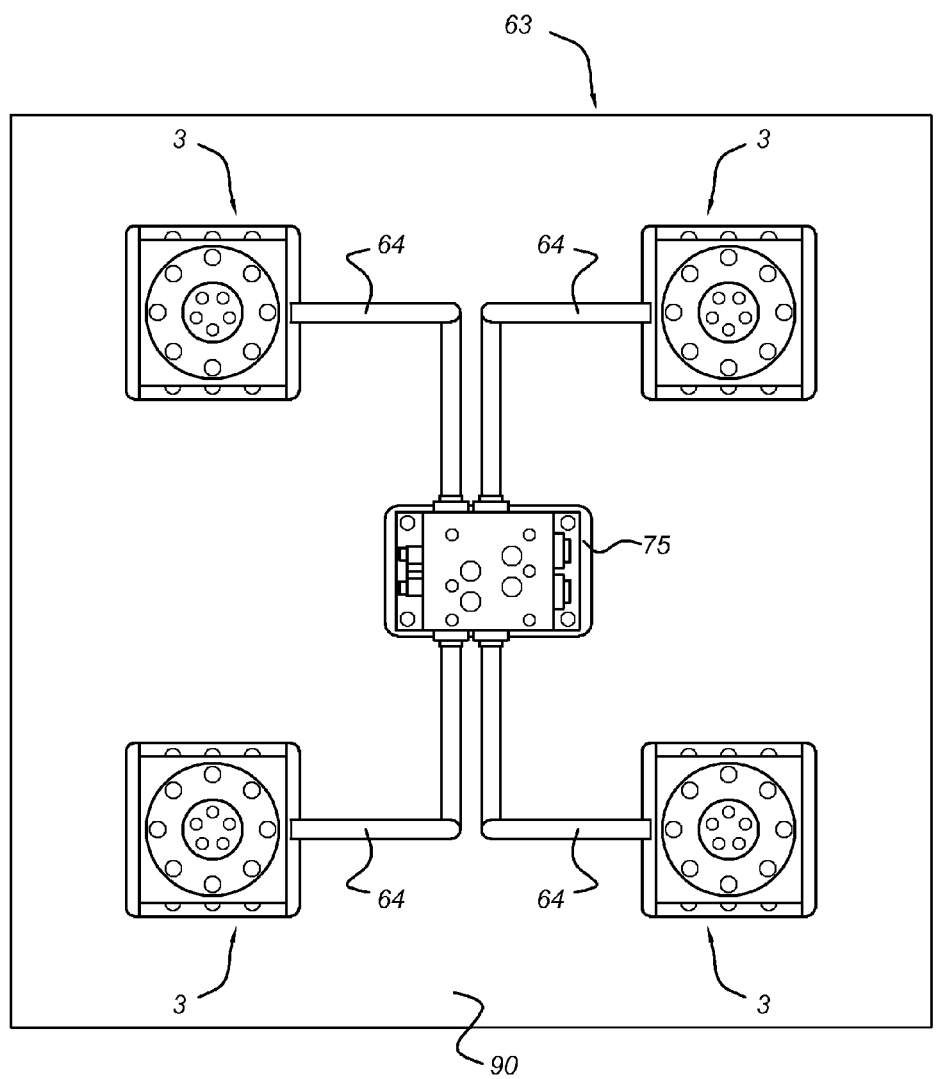

FIG. 4 shows a diagrammatic side view of the hydraulic exciter device from FIG. 3. FIG. 5 shows a hydraulic diagram (not to scale) of the same exciter device. FIG. 6 shows a diagrammatic top view of the same hydraulic exciter device.

FIG. 4 shows two of the four hydraulic exciters 3, all of which are shown in FIG. 5 and FIG. 6. The hydraulic exciters 3 are all connected to a foundation plate 90 by means of bolts, the former being connected to a concrete foundation 91 by means of further bolts. The hydraulic exciters 3 are all connected to a single electro-hydraulic servo valve, diagrammatically represented by 70. FIG. 4 and FIG. 5 furthermore show a first, second and third pump line 82, 83, 85, a pump 84 and a tank 86 which form a hydraulic pump circuit in which the pump 84, via the first pump line 82, pumps a hydraulic fluid to the electro-hydraulic servo valve 70 with a first volumetric flow. The hydraulic fluid subsequently returns to the tank 86 from the electro-hydraulic servo valve 70 via the second pump line 83. The tank 86 is connected to the third pump line 85 on the pump 84.

In use, the electro-hydraulic servo valve 70 ensures the fluid flow from the first pump line 82 to a hydraulic main supply pipe 72 and from a hydraulic main discharge pipe 73 to the second pump line 82, and thus regulates the volumetric flow in the hydraulic main supply pipe 72 and the hydraulic main discharge pipe 73. To this end, the electro-hydraulic servo valve 70 is actuated via electrical control lines 9 from the electronic control device 11. In a first state, the electro-hydraulic servo valve 70 connects the hydraulic main supply pipe 72 to the first pump line 82 with the pump 85 and at the same time connects the hydraulic main discharge pipe 73, via the second pump line 83, to the tank 86, by means of which the volumetric flow supplied by the pump 85 is passed to the hydraulic main supply pipe 72. The flow of the hydraulic fluid through the respective pipes in the first state is illustrated in FIG. 5 by means of full arrows. In a second state, the electro-hydraulic servo valve 70 connects the hydraulic main discharge pipe 73 to the first pump Line 82 with the pump 85 and at the same time connects the hydraulic main supply pipe 72, via the second pump line 83, to the tank 86 by means of which the volumetric flow supplied by the pump 85 is passed to the hydraulic main discharge pipe 73. The flow of the hydraulic fluid through the respective pipes in the second state is illustrated in FIG. 5 by means of dashed arrows. The hydraulic main supply pipe 72 and the hydraulic main discharge pipe 73 are coupled to respective and substantially identical distribution supply pipes 64 and distribution discharge pipes 65 via a manifold 75. The hydraulic main supply pipe 72 thus branches in the manifold 75 into in this example four distribution supply pipes 64. The hydraulic main discharge pipe 73 thus branches in the manifold 75 into in this example four distribution discharge pipes 5. Substantially identical is understood to mean that the distribution supply pipes and the distribution discharge pipes, respectively, behave in substantially the same manner when a hydraulic fluid which is present therein is offered the same hydraulic volumetric flow. For example, each of the distribution supply pipes 63 and the distribution discharge pipes 64, respectively, are made of substantially the same material and have substantially the same diameter, substantially the same stiffness in the longitudinal direction and substantially the same stiffness in the circumferential direction. The total volumetric flow is thus evenly distributed between the distribution supply pipes 63 and the distribution discharge pipes 64, respectively. The distribution supply pipes 64 act as first hydraulic pipes as described with reference to FIG. 2. The distribution discharge pipes 65 act as second hydraulic pipes as described with reference to FIG. 2.

Thus, a hydraulic volumetric flow to/from the upper space 29a of each of the hydraulic exciters 3 is regulated via the hydraulic main supply pipe 72, the manifold 75 and the respective distribution supply pipe 64, and the hydraulic volumetric flow from/to the lower space 29b of each of the hydraulic exciters 3 is regulated via the hydraulic main discharge pipe 73, the manifold 75 and the respective distribution discharge pipe 65. The hydraulic exciters are driven synchronously by means of the single valve 70. The use of a single valve 70 offers the advantage, for example, that the exciters 3 operate synchronously without requiring additional measures. Moreover, this makes it possible to avoid the extra costs of additional electro-hydraulic servo valves 70 which would be required if each exciter had its own servo valve.

The drive means 7 illustrated diagrammatically in FIG. 3 thus comprises the electro-hydraulic servo valve 70, the pump circuit, the manifold 75 and the supply pipes 64 and main discharge pipes 75. In use, the hydraulic exciters 3 are driven at mutually substantially the same amplitude and frequency and in phase with one another by means of the drive means 7 in cooperation with the control means 11.

A plurality of hydraulic supply pipe paths between the servo valve 70 and the respective hydraulic exciters 3 are formed by the common hydraulic main supply pipe 72, an internal path in the manifold 75 and the respective distribution supply pipes 64. These hydraulic supply pipe paths are identical in length and volume. Likewise, a plurality of hydraulic discharge pipe paths are formed between the servo valve 70 and the respective hydraulic exciters 3 by the common hydraulic main discharge pipe 73, a further internal path in the manifold 75 and the respective distribution discharge pipes 65. These hydraulic discharge pipe paths are likewise identical in length and volume. The hydraulic pipe paths thus behave the same for each hydraulic exciter 3. As a result thereof, the exciters are not only operated at the same frequency, but also in phase with one another. All exciters will thus move at the same frequency, without phase differences between the various exciters.

Of the four hydraulic exciters 3, a first hydraulic exciter 3 is provided with a sensor 80 (illustrated in FIG. 2a) for emitting a position signal representative of the position of the first hydraulic exciter 3, that is to say of the piston rod 2 with respect to the housing 30. The sensor 80 is in communication with the control means 11 for regulating a working position and/or an amplitude of the first hydraulic exciter 3 by means of the control means 11 and drive means 7. The device is configured in such a manner that the rigid connection between the exciters, in use, normally results in a smoothing out of any small differences between the internal friction in the various exciters 3, and so that the hydraulic exciters 3 with the same working position, amplitude, frequency and phase make the vibrating table 1 vibrate. Thus, it is possible to operate all exciters synchronously using only the position signal of the first hydraulic exciter.

In an alternative embodiment, each of the hydraulic exciters 3 is provided with its own sensor 80 and each of the hydraulic exciters 3 is driven by its own servo valve, with the control means 11 actuating the servo valves of the various exciters in phase and amplitude in such a manner that the hydraulic exciters 3 are operated at the same amplitude, frequency and phase.

Figure 7A:
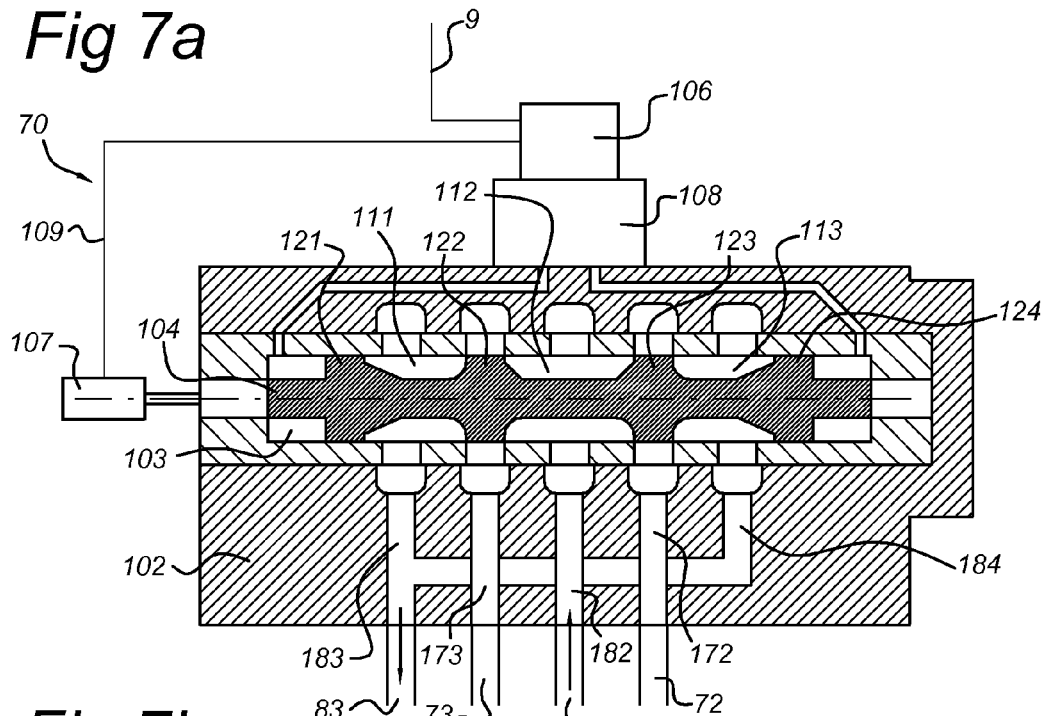
FIG. 7a, FIG. 7b and FIG. 7c show an example of an electro-hydraulic servo valve for the hydraulic exciter device from FIG. 3-FIG. 5.
Figure 7B:
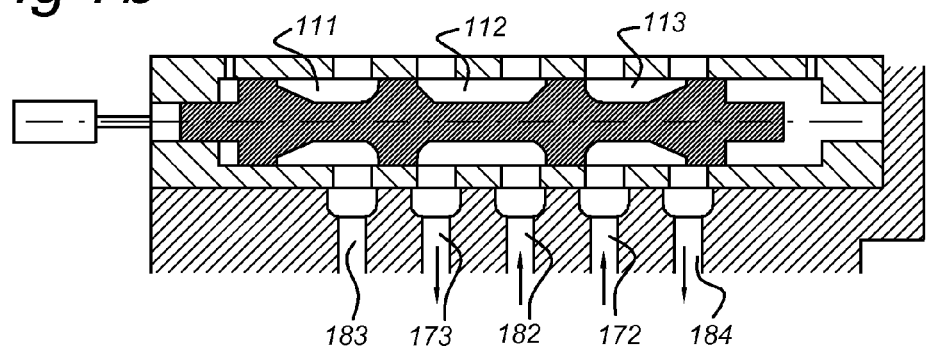
Figure 7C:
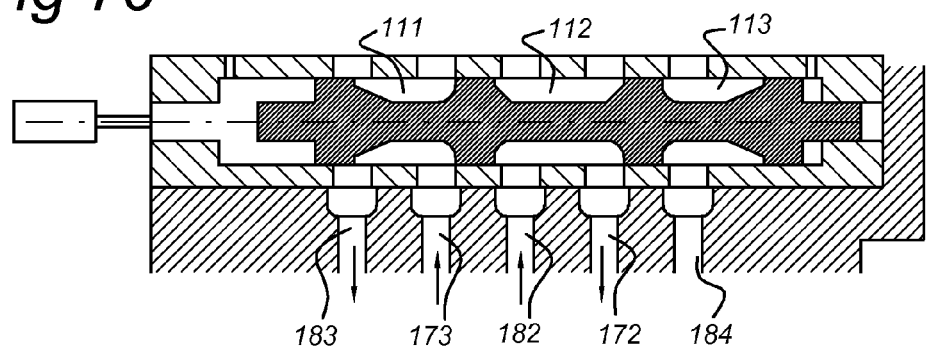

FIG. 7a, FIG. 7b and FIG. 7c show an example of the electro-hydraulic valve 70 according to an embodiment of the compacting device with a hydraulic exciter device. The electro-hydraulic servo valve 70 has a 3-step structure and comprises a valve body 104, which can be moved to and fro hydraulically in a cylindrical cavity 103 in a valve housing 102 by means of a hydraulic intermediate valve 108, which is operated in turn by an electro-hydraulic pilot valve 106 which is actuated via electrical control line 9 and an electrical feedback line 109 from a measuring device 107 which is configured to emit a feedback signal, indicative of the position of the valve body 104 in the cylindrical cavity 104. A known type of such an electro-hydraulic servo valve 70 is, for example, the Type 4 WSE 3 EE 32 servo valve by Bosch Rexroth. Such a valve is highly dynamic, that is to say that it can be used up to approximately 100 Hz, and has a high capacity due to the 3-stage structure. The valve body 104 is a rod-shaped element with thickenings 121, 122, 123 and 124, the outer diameter of which corresponds to the inner diameter of the cylindrical cavity. Between the thickenings 121, 122, 123 and 124, there are annular recesses 111, 112, 113. In the valve housing 102, there are 5 ducts 183, 173, 182, 172 and 184 between the cylindrical cavity and four connecting points to the second pump line 83 (to the tank 86), the hydraulic main discharge pipe 73 (to the manifold 75), the first pump line 82 (from the pump 85), the hydraulic main supply pipe 72 (to the manifold 75) and—again—the second pump line 83 (to the tank 86), respectively. The electro-hydraulic servo valve 70 can be brought into three states: a first (operating) state, a second (operating) state and a neutral state.

FIG. 7a shows the electro-hydraulic valve 70 in the neutral state, in which thickening 122 closes off duct 173 (and thus the hydraulic main discharge pipe 73) and thickening 123 closes off duct 172 (and thus the hydraulic supply pipe 72).

In the first state, illustrated in FIG. 7c, the valve body is moved slightly to the right, so that recess 111 creates a connection between ducts 183 and 173, and recess 112 creates a connection between ducts 182 and 172. In the first state, the electro-hydraulic servo valve 70 thus connects the hydraulic main supply pipe 72 to the pump via the first pump line 82 and at the same time connects the hydraulic main discharge pipe 73 to the tank 85 via the second pump line 83.

In the second state, illustrated in FIG. 7b, the valve body is moved slightly to the left, so that recess 112 creates a connection between ducts 182 and 173, and recess 113 creates a connection between ducts 184 and 172. In the second state, the electro-hydraulic servo valve 70 thus connects the hydraulic main discharge pipe 73 to the pump 85 via the first pump line 82 and at the same time connects the hydraulic main supply pipe 72 to the tank 85 via the second pump line 83.

Preferably, the vibrating table 1 is rectangular or square. FIG. 8 shows an example of a square vibrating table 1. The rectangular or square vibrating table 1 may be composed of a plurality of adjoining, identical rectangular or square parts 100 whose number is equal to the number of exciters 3. In the illustrated embodiment, each exciter 3 is connected to the vibrating table 1 at the intersection 102 of the diagonals 101 of the respective rectangular or square part. This may be advantageous when producing a uniform excitation across the entire vibrating table 1, without nodes and antinodes, so that a uniform compaction can be achieved and/or fatigue stresses are reduced as far as possible. In an alternative embodiment, each exciter 3 is connected to the vibrating table 1 between the intersection 102 of the diagonals 101 of the respective rectangular or square part and the outer circumference of the vibrating table, at most 25% of the distance between the intersection 102 of the diagonals 101 and a corner of the respective rectangular or square part. This may be advantageous for a uniform excitation and/or lower fatigue stress.

The invention claimed is:

1. A compacting device for compacting a granular, loosely coherent mass for producing end products, the compacting device comprising:
   a vibrating table;
   a mould which is intended for the mass to be compacted and which is attached to the vibrating table, at least during use of the compacting device; and
   a hydraulic exciter device connected to the vibrating table, wherein the hydraulic exciter device comprises a plurality of hydraulic exciters, each hydraulic exciter is connected to the vibrating table, the hydraulic exciters are mutually parallel, and the hydraulic exciter device is configured to drive the hydraulic exciters with excitation displacements of mutually substantially the same amplitude and the same frequency and in phase with one another, wherein a drive means is provided which is configured so as to evenly distribute a hydraulic volumetric flow of a compressible hydraulic medium between all the hydraulic exciters, wherein the drive means comprises an electro-hydraulic servo valve, a manifold and a plurality of distribution pipes, wherein the servo valve is configured to provide a hydraulic volumetric flow to the manifold and wherein the manifold is configured to evenly distribute the hydraulic volumetric flow from the servo valve between the distribution pipes, which distribution pipes are connected to respective hydraulic exciters.

2. The compacting device according to claim 1, wherein the hydraulic pipe paths, measured from the electro-hydraulic servo valve to each of the respective hydraulic exciters, are identical in length and in volume.

3. The compacting device according to claim 1, wherein a control means is provided which is configured to control the drive of each of the hydraulic exciters of the plurality of hydraulic exciters on the basis of a determination of the excitation displacement of one and only one single hydraulic exciter of the plurality of hydraulic exciters.

4. The compacting device according to claim 3, wherein the control means are configured to actuate the electro-hydraulic servo valve on the basis of the determination of the excitation displacement.

5. The compacting device according to claim 3, wherein the single hydraulic exciter is provided with a sensor, such as a displacement sensor, which is configured to determine the excitation displacement of the one and only one single hydraulic exciter and to pass on the determined excitation displacement to the control means.

6. The compacting device according to claim 1, wherein the hydraulic exciter device is configured to drive the hydraulic exciters according to a continuously variable control function.

7. The compacting device according to claim 6, wherein the hydraulic exciter device is configured to carry out a method which comprises the following steps:
   selecting a frequency range with a lowest value and a highest value for an excitation frequency, and
   regulating the excitation frequency in such a manner that said frequency range is passed through at least partly and that a natural frequency of the hydraulic-mechanical mass spring system is reached and passed, said hydraulic-mechanical mass spring system being formed by the movable part of the exciter, the vibrating table, the mould and the mass to be compacted, as well as the compressible hydraulic medium which is situated between the hydraulic exciters and the drive means.

8. The compacting device according to claim 1, wherein each hydraulic exciter is connected to the vibrating table at a respective excitation position on the vibrating table, and wherein the excitation positions are evenly distributed across the vibrating table.

9. The compacting device according to claim 1, wherein the vibrating table is composed of a plurality of adjoining, identical rectangular or square parts, whose number is equal to the number of hydraulic exciters.

10. The compacting device according to claim 1, wherein each hydraulic exciter comprises a piston/cylinder device wherein at least one piston rod is provided which is connected to the vibrating table at a respective excitation position on the vibrating table.

11. The compacting device according to claim 10, wherein the piston rod is rigidly connected to the piston of the piston/cylinder device.

12. The compacting device according to claim 10, wherein the piston is movable in a piston chamber and a first hydraulic pipe and a second hydraulic pipe on either side of the piston are connected to the piston chamber.

13. The compacting device according to claim 12, wherein the drive means and the control means are configured to provide a hydraulic volumetric flow of a determined frequency and phase in the first hydraulic pipe and to provide a hydraulic volumetric flow of the same determined frequency and opposite phase in the second hydraulic pipe.

14. The compacting device according to claim 10, wherein the hydraulic exciters are rigidly connected to one another.

15. The compacting device according to claim 14, wherein the piston rods of the hydraulic exciters are mutually connected in a flexurally stiff manner in a plane which is defined by the axes of in each case two piston rods.

16. The compacting device according to claim 15, wherein the piston rods of the hydraulic exciters are rigidly connected to one another by means of the vibrating table.

17. The compacting device according to claim 10, wherein each hydraulic exciter comprises a housing provided with at least one bearing for guiding the at least one piston rod in the housing, which bearing is provided with a metal/polymer layer.

18. The compacting device according to claim 17, wherein each hydraulic exciter comprises two piston rods which extend from either side of the piston, and the housing comprises two respective bearings.

19. The compacting device according to claim 17, wherein the metal/polymer layer comprises a fluoropolymer, preferably a polytetrafluoroethylene.

20. The compacting device according to claim 17, wherein the metal/polymer layer is formed substantially from DP31™.

21. The compacting device according to claim 1, comprising a stamp for pressing the mass in the mould during use.

22. A compacting device for compacting a granular, loosely coherent mass for producing end products, the compacting device comprising:
a vibrating table;
a mould which is intended for the mass to be compacted and which is attached to the vibrating table, at least during use of the compacting device; and
a hydraulic exciter device connected to the vibrating table, wherein the hydraulic exciter device comprises a plurality of hydraulic exciters, each hydraulic exciter is connected to the vibrating table, the hydraulic exciters are mutually parallel, and the hydraulic exciter device is configured to drive the hydraulic exciters with excitation displacements of mutually substantially the same amplitude and the same frequency and in phase with one another, wherein a drive means is provided which is configured so as to evenly distribute a hydraulic volumetric flow of a compressible hydraulic medium between all the hydraulic exciters,
wherein the vibrating table is composed of a plurality of adjoining, identical rectangular or square parts, whose number is equal to the number of hydraulic exciters, and
wherein each hydraulic exciter is connected to the vibrating table at the intersection of the diagonals of the respective rectangular or square part.

23. A method for operating a compacting device with a hydraulic exciter device comprising a plurality of hydraulic exciters, comprising:
driving all the hydraulic exciters of the plurality of hydraulic exciters with excitation displacements of the same amplitude and the same frequency and in phase with one another,
providing a source of hydraulic fluid;
providing a hydraulic volumetric flow of a determined amplitude and frequency to the hydraulic fluid; and
evenly distributing, from a distribution point, the hydraulic volumetric flow between a plurality of hydraulic paths of identical length and identical volume measured from the distribution point up to the respective hydraulic exciter with drive means comprising an electro-hydraulic servo valve, a manifold and a plurality of distribution pipes, the servo valve being configured to provide a hydraulic volumetric flow to a manifold configured to evenly distribute the hydraulic volumetric flow from the servo valve between distribution pipes to respective hydraulic exciters.

24. The method according to claim 23, comprising the following steps:
determining the excitation displacement of a single hydraulic exciter of the plurality of hydraulic exciters; and
driving each of the hydraulic exciters of the plurality of hydraulic exciters on the basis of the excitation displacement of only the one hydraulic exciter.

25. The method according to claim 23, comprising
selecting a frequency range with a lowest value and a highest value for an excitation frequency; and
regulating the excitation frequency in such a manner that said frequency range is passed through at least partly and that the natural frequency of the hydraulic-mechanical mass spring system is reached and exceeded, said hydraulic-mechanical mass spring system being formed by the movable part of the exciter, the vibrating table, the mould and the mass to be compacted, as well as the compressible hydraulic medium which is situated between the hydraulic exciters and the drive means.

* * * * *